(12) United States Patent
Roitman

(10) Patent No.: US 10,740,338 B2
(45) Date of Patent: Aug. 11, 2020

(54) SYSTEMS AND METHODS FOR QUERY PERFORMANCE PREDICTION USING REFERENCE LISTS

(71) Applicant: International Business Machines Corporation, Armonk, NY (US)

(72) Inventor: Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 15/657,157

(22) Filed: Jul. 23, 2017

(65) Prior Publication Data
US 2019/0026279 A1   Jan. 24, 2019

(51) Int. Cl.
G06F 16/24        (2019.01)
G06F 16/2457      (2019.01)
G06N 5/04         (2006.01)
G06F 16/28        (2019.01)

(52) U.S. Cl.
CPC ...... *G06F 16/24578* (2019.01); *G06F 16/285* (2019.01); *G06N 5/04* (2013.01)

(58) Field of Classification Search
CPC ............................................. G06F 16/24578
USPC ........................................................ 707/737
See application file for complete search history.

(56) References Cited

U.S. PATENT DOCUMENTS 9,122,727 B1 *  9/2015  Liu ................... G06F 16/24568
9,430,533 B2    8/2016  Awadallah et al.
2013/0124474 A1 * 5/2013  Anderson ............. G06F 16/285
                                                             707/634
2015/0269156 A1 * 9/2015  Awadallah ........ G06F 16/24578
                                                             707/732
2016/0140232 A1 * 5/2016  Smirnov ............... G06F 16/951
                                                             707/768

OTHER PUBLICATIONS

Shtok et al., "Query Performance Prediction Using Reference Lists", ACM Transactions on Information Systems, vol. 34, No. 4, Article 19, Publication date: Jun. 2016.
Roitman, "An Enhanced Approach for Query Performance Prediction Using Reference Lists", ACM SIGIR 2017.
(Continued)

*Primary Examiner* — Syling Yen
(74) *Attorney, Agent, or Firm* — Roy S. Melzer

(57) ABSTRACT

A method of computing a query performance prediction (QPP), comprising: receiving a target search query and a set of target search results obtained by executing the target search query on a corpus of data-elements, computing variations of the target search query, receiving a candidate set of search results for each of the variations, computing a statistical similarity metric indicative of statistically significant similarity or dissimilarity between each candidate set of search results and the set of target search results, clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement, and computing the QPP of the target search results responsive to the target search query according to an aggregation of the PR-RL cluster and PIE-RL cluster.

20 Claims, 3 Drawing Sheets

(56) References Cited

OTHER PUBLICATIONS

Kurland et al., "Utility estimation framework for query-performance prediction", Based on work presented in SIGIR'10 and ICTIR'11.

Kurland et al., "A Unified Framework for Post-Retrieval Query-Performance Prediction", ICTIR 2011, LNCS 6931, pp. 15-26, 2011.

* cited by examiner

SYSTEMS AND METHODS FOR QUERY PERFORMANCE PREDICTION USING REFERENCE LISTS

BACKGROUND

The present invention, in some embodiments thereof, relates to systems and methods for computing a query performance prediction and, more specifically, but not exclusively, to systems and methods for computing a post-retrieval query performance prediction.

A post-retrieval query performance prediction (QPP) predicts the effectiveness of a search result list retrieved from a corpus by a retrieval method in response to a search query. QPP quantifies the quality of the search results retrieved from the corpus without relevance feedback being provided.

SUMMARY

According to a first aspect, a computer implemented method of providing a client terminal with a query performance prediction in response to a target search query, comprises: executing a code by at least one hardware processor of a computing device for: receiving a target search query and a corresponding set of target search results obtained by a search code executing the target search query on a corpus of data-elements, computing a plurality of variations of the target search query, receiving a respective candidate set of search results for each of the plurality of variations of the target search query executed by the search code on the corpus of data-elements, computing a statistical similarity metric indicative of statistically significant similarity or dissimilarity between each respective candidate set of search results and the set of target search results, clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement, computing the query performance prediction of the target search results responsive to the target search query according to an aggregation of the PR-RL cluster and PIE-RL cluster, and outputting the query performance prediction.

According to a second aspect, a system for providing a client terminal with a query performance prediction in response to a target search query, comprises: a non-transitory memory having stored thereon a code for execution by at least one hardware processor of a computing device, the code comprising: code for receiving a target search query and a corresponding set of target search results obtained by a search code executing the target search query on a corpus of data-elements, code for computing a plurality of variations of the target search query, code for receiving a respective candidate set of search results for each of the plurality of variations of the target search query executed by the search code on the corpus of data-elements, code for computing a statistical similarity metric indicative of statistically significant similarity or dissimilarity between each respective candidate set of search results and the set of target search results, code for clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement, code for computing the query performance prediction of the target search results responsive to the target search query according to an aggregation of the PR-RL cluster and PIE-RL cluster, and code for outputting the query performance prediction.

According to a third aspect, a computer program product for providing a client terminal with a query performance prediction in response to a target search query, comprises: a non-transitory memory having stored thereon a code for execution by at least one hardware processor of a computing device, the code comprising: instructions for receiving a target search query and a corresponding set of target search results obtained by a search code executing the target search query on a corpus of data-elements, instructions for computing a plurality of variations of the target search query, instructions for receiving a respective candidate set of search results for each of the plurality of variations of the target search query executed by the search code on the corpus of data-elements, instructions for computing a statistical similarity metric indicative of statistically significant similarity or dissimilarity between each respective candidate set of search results and the set of target search results, instructions for clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement, instructions for computing the query performance prediction of the target search results responsive to the target search query according to an aggregation of the PR-RL cluster and PIE-RL cluster, and instructions for outputting the query performance prediction.

The systems and/or methods and/or code instructions described herein address the technical problem of improving accuracy of a computed query prediction performance for a target search query. An accurate computed query prediction performance is indicative of the accuracy of the target search results (obtained by the search engine processing the target search query) in view of the target search query. The computed query prediction performance may be presented as feedback to a user as an indication of how well the retrieved set of target search results corresponds to the target search query. In view of a low value of the query prediction performance, which indicates that the search results are unreliable, the user may reword the search query in an attempt to obtain more reliable search results (i.e., a higher value of the query prediction performance). In another example, an accurate computed query prediction performance may be implemented for a vertical search process (i.e., where the query is sent to multiple search engine) for selection of the most relevant search results provided by a certain search engine. In yet another example, an accurate computed query prediction performance may be implemented as a fusion process (i.e., where results provided by multiple search engines in response to a search query are combined), for guiding the weights assigned to search results obtained from different search engines. In yet another example, an accurate computed query prediction performance may be implemented as a component of a query suggestion process, in which the user is presented with recommendations for rewriting of the search query to improve the reliability and/or relevance of the results.

The systems and/or methods and/or code instructions described herein improve performance of a network providing communication between a client terminal (where the target search query is received) and a search engine server (which retrieves the target search results and forwards the results to the client terminal). The computed query prediction performance (as described herein), reduces the number of times that the user manually adjusts the target search query, reducing the network resources (e.g., bandwidth, network component utilization, network component processing time) that would otherwise be required for each additional cycle of transmission of the search query from the client terminal to the search engine server, and transmission of the results from the search engine server back to the client terminal. For example, based on the query prediction performance, the user may ascertain whether the search results are relevant or not, rather than opening up the search results (which may require additional bandwidth to download the resulting documents and/or access the resulting web sites) and/or trying different search queries to compare the search results.

The systems and/or methods and/or code instructions described herein improve performance of a client terminal that receives the target search query (e.g., entered by a user using a user interface), transmits the target search query to the search engine server, receives the search results from the search engine server, and presents the search results on a display (e.g., within a graphical user interface (GUI)). The improved performance is, for example, in terms of reduced data storage requirements (e.g., in terms of fewer saved and/or open data items being evaluated by the user for relevance), reduced processor utilization, and/or reduced processing time. The improved performance is obtained by the computed query prediction performance which reduces the number of additional searches that the user would otherwise perform, as described above.

In a further implementation form of the first, second, and third aspects, each of the plurality of variations of the target search query are computed by expanding the target search query with a respective single additional term identified as relevant to one or more terms of the target search query according to a relevance requirement.

In a further implementation form of the first, second, and third aspects, the method further comprises and/or the processor is further configured to and/or the computer program product includes additional instructions for computing, for each respective candidate set of search results, a score transformation computed based on an association between a first relevance score computed by the search code for the respective candidate set of search results and a second relevance score computed by the search code for the corpus of data-entities, wherein the statistical similarity metric is computed according to the score transformation computed for the respective candidate set of search results.

In a further implementation form of the first, second, and third aspects, the score transformation is computed based on at least one of: a normalization of the difference between the first relevance score and the second relevance score, and a ratio of the first relevance score and the second relevance score.

In a further implementation form of the first, second, and third aspects, the statistical similarity metric is computed as a statistical hypothesis test of equality of distribution of means of a first prediction score computed based on the set of target research results and a second prediction score computed based on the respective candidate set of search results, wherein the respective candidate set of search results is clustered into the PE-RL when a null hypothesis is rejected and the second prediction score is statistically significantly higher than the first prediction score, and wherein the respective candidate set of search results is clustered into the PIE-RL when the null hypothesis is rejected and the second prediction score is statistically significantly lower than the first prediction score.

In a further implementation form of the first, second, and third aspects, the statistical similarity metric is computed as a statistical hypothesis test of equality of variance of a first prediction score computed based on the set of target research results and a second prediction score computed based on the respective candidate set of search results, wherein the respective candidate set of search results is clustered into the PE-RL when a null hypothesis is rejected and the second prediction score is statistically significantly higher than the first prediction score, and wherein the respective candidate set of search results is clustered into the PIE-RL when the null hypothesis is rejected and the second prediction score is statistically significantly lower than the first prediction score.

In a further implementation form of the first, second, and third aspects, the method further comprises and/or the processor is further configured to and/or the computer program product includes additional instructions for computing a confidence value associated with the statistical similarity metric computed for each candidate set of search results, and selecting a sub-set of the candidate sets of search results according to a confidence requirement, wherein the clustering is performed for the selected sub-set of the candidates.

In a further implementation form of the first, second, and third aspects, the aggregation of the PE-RL cluster and the PIE-RL cluster is based on a weighted mean of a computed prediction quality score of each member of the PE-RL cluster and each member of the PIE-RL cluster.

In a further implementation form of the first, second, and third aspects, the weight of the weighted mean is computed according to the statistical similarity metric between the target search results and the respective member of the PE-RL cluster and the respective member of the PIE-RL cluster, and the mean of the weighted mean is according to the computed prediction quality score.

In a further implementation form of the first, second, and third aspects, the target search query associated with the target search result that is relatively more similar to the PE-RL cluster is associated with a relatively higher query performance prediction than the target search query associated with the target search result that is relatively more similar to the PIE-RL cluster.

In a further implementation form of the first, second, and third aspects, the aggregation of the PE-RL cluster and the PIE-RL cluster is performed according to an inter-set similarity metric indicative of a level of agreement between an expected and an observed intersection size between the target search results and each member of the PE-RL cluster and the PIE-RL cluster.

In a further implementation form of the first, second, and third aspects, the target search result and the candidate set of search results include a list of a top predefined number of data-elements from the corpus each associated with a score computed by the search code.

In a further implementation form of the first, second, and third aspects, the more statistically similar the target search list is to the PE-RL cluster, and the more statistically dissimilar the target search list is from the PIE-RL cluster, the better the predicted query performance of the target search query.

In a further implementation form of the first, second, and third aspects, the method further comprises and/or the processor is further configured to and/or the computer program product includes additional instructions for executing a vertical search process based on forwarding the target search query to a plurality of search engines, wherein the query performance prediction is computed for each target search results received from each search engine of the plurality of search engines, and selecting a certain target search result received from a certain search engine according to a requirement of the computed query performance prediction.

In a further implementation form of the first, second, and third aspects, the method further comprises and/or the processor is further configured to and/or the computer program product includes additional instructions for executing a fusion process based on forwarding the target search query to a plurality of search engines, wherein the query performance prediction is computed for each target search results received from each search engine of the plurality of search engines, computing a weight for each respective target search result received from each search engine of the plurality of search engines according to the computed query performance prediction, and computing a combination of search results according to the weights.

In a further implementation form of the first, second, and third aspects, the method further comprises and/or the processor is further configured to and/or the computer program product includes additional instructions for executing a query suggestion process based on computing a plurality of amended versions of the target search query, wherein the query performance prediction is computed for each amended versions of the target search query, and selecting a certain amended version of the target search query according to a requirement of the computed query performance prediction.

In a further implementation form of the first, second, and third aspects, the computing device comprises a search engine server that further stores on the non-transitory memory the search code for executing the target search query on the corpus of data-elements, wherein the search code is executed by the at least one hardware processor of the search engine server.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
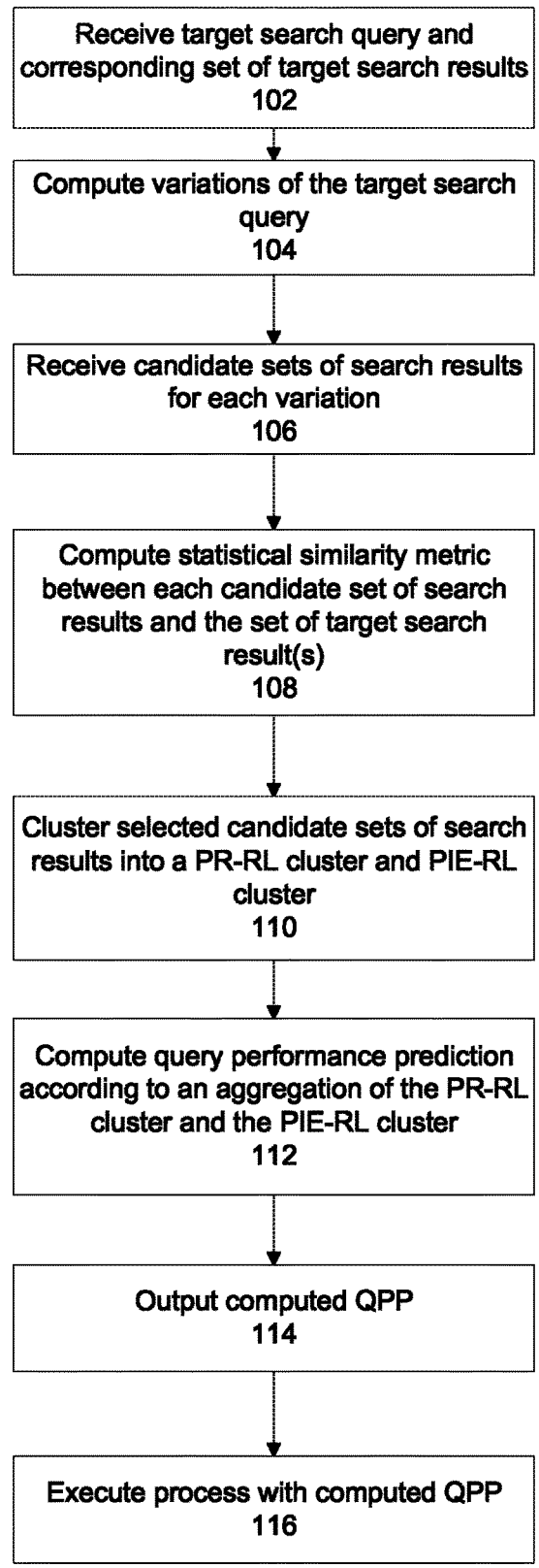
FIG. 1 is a flowchart of a method of computing a query performance prediction in response to a target search query, based on an aggregation of a cluster of PE-RL and a cluster PIE-RL that include candidate sets of search results created from variations of the target search query, in accordance with some embodiments of the present invention.

The present invention, in some embodiments thereof, relates to systems and methods for computing a query performance prediction and, more specifically, but not exclusively, to systems and methods for computing a post-retrieval query performance prediction.

An aspect of some embodiments of the present invention relates to systems, an apparatus, methods, and/or code instructions (stored in a data storage device executable by one or more hardware processors) for computing a post-retrieval query performance prediction (QPP) in response to a target search query, based on an aggregation of a cluster of pseudo effective reference lists (PE-RL) and a cluster of pseudo ineffective reference lists (PIE-RL). The clusters are computed from candidate sets of search results that are obtained by executing respective variations of the target search query by search engine code on a corpus of data-elements. A statistical similarity metric is computed between each of the candidate set of search results and the set of target search results (obtained from the corpus of data-elements by the search engine code executing the target search query). The statistical similarity metric is indicative of statistically significant similarity or dissimilarity between the respective candidate set of search results and the set of target search results. Statistically irrelevant and/or statistically indeterminant candidate sets are excluded from clustering (e.g., when the statistical similarity metric is not indicative of a statistical certainty according to a requirement). The selected candidate sets of search results are clustered according to the respective computed statistical similarity metric, into the PE-RL cluster according to a statistical similarity requirement, or the PIE-RL cluster according to a statistically dissimilarity requirement. The target search query (associated with the target search result) that is relatively more similar to the PE-RL cluster is associated with a relatively higher query performance prediction than the target search query that is relatively more similar to the PIE-RL cluster. The computed query performance prediction may be presented on a display of a client terminal, and/or further processed.

Effectively, the more statistically similar the target search list is to the PE-RL cluster, and the more statistically dissimilar the target search list is from the PIE-RL cluster, the better the predicted query performance of the target search query.

Optionally, the aggregation of the PE-RL cluster and the PIE-RL cluster is based on a weighted mean of a computed prediction quality score of each member of the PE-RL cluster and each member of the PIE-RL cluster. The weight of the weighted mean may be computed according to the statistical similarity metric of the respective member of the PE-RL cluster and the respective member of the PIE-RL cluster, and the mean of the weighted is according to the computed prediction quality score.

Optionally, the aggregation of the PE-RL cluster and the PIE-RL cluster is performed according to an inter-set similarity metric indicative of a level of agreement between an expected and an observed intersection size between the target search results and each member of the PE-RL cluster and the PIE-RL cluster.

The systems and/or methods and/or code instructions described herein address the technical problem of improving accuracy of a computed query prediction performance for a target search query. An accurate computed query prediction performance is indicative of the accuracy of the target search results (obtained by the search engine processing the target search query) in view of the target search query. The computed query prediction performance may be presented as feedback to a user as an indication of how well the retrieved set of target search results corresponds to the target search query. In view of a low value of the query prediction performance, which indicates that the search results are unreliable, the user may reword the search query in an attempt to obtain more reliable search results (i.e., a higher value of the query prediction performance). In another example, an accurate computed query prediction performance may be implemented for a vertical search process (i.e., where the query is sent to multiple search engine) for selection of the most relevant search results provided by a certain search engine. In yet another example, an accurate computed query prediction performance may be implemented as a fusion process (i.e., where results provided by multiple search engines in response to a search query are combined), for guiding the weights assigned to search results obtained from different search engines. In yet another example, an accurate computed query prediction performance may be implemented as a component of a query suggestion process, in which the user is presented with recommendations for rewriting of the search query to improve the reliability and/or relevance of the results.

The systems and/or methods and/or code instructions described herein improve performance of a network providing communication between a client terminal (where the target search query is received) and a search engine server (which retrieves the target search results and forwards the results to the client terminal). The computed query prediction performance (as described herein), reduces the number of times that the user manually adjusts the target search query, reducing the network resources (e.g., bandwidth, network component utilization, network component processing time) that would otherwise be required for each additional cycle of transmission of the search query from the client terminal to the search engine server, and transmission of the results from the search engine server back to the client terminal. For example, based on the query prediction performance, the user may ascertain whether the search results are relevant or not, rather than opening up the search results (which may require additional bandwidth to download the resulting documents and/or access the resulting web sites) and/or trying different search queries to compare the search results.

The systems and/or methods and/or code instructions described herein improve performance of a client terminal that receives the target search query (e.g., entered by a user using a user interface), transmits the target search query to the search engine server, receives the search results from the search engine server, and presents the search results on a display (e.g., within a graphical user interface (GUI)). The improved performance is, for example, in terms of reduced data storage requirements (e.g., in terms of fewer saved and/or open data items being evaluated by the user for relevance), reduced processor utilization, and/or reduced processing time. The improved performance is obtained by the computed query prediction performance which reduces the number of additional searches that the user would otherwise perform, as described above.

The systems and/or methods and/or code instructions described herein improve an underlying technical process within the technical field of information retrieval (IR), in particular, by improving the accuracy of a computed query prediction performance of a target set of search results obtained in response to a target search query.

The systems and/or methods and/or code instructions described herein are tied to physical real-life components, including or more of: a hardware processor executing code instructions, a memory storing the code instructions, a network for transmitting the search query and/or transmitting the search results, a user interface for entering the search query, and/or a display for presenting the computed query performance prediction.

The systems and/or methods and/or code instructions described herein do not simply describe computation of a query performance prediction using a mathematical operation and receiving and storing data, but combine the acts of computing variations of the target search query to obtain candidates sets of search results, computing a statistical similarity metric indicative of statistical similarity or dissimilarity between each respective candidate set of search results and the set of target search results, clustering the candidate sets of search results into a cluster of pseudo effective reference lists (PE-RL) according to an association with statistical similarity, and into a cluster of pseudo ineffective reference lists (PIE-RL) according to an associated with statistically dissimilarity, aggregating the PR-RL cluster and PIE-RL cluster, and outputting the query performance prediction for presentation and/or further processing by other code. By this, the systems and/or methods and/or code instructions stored in a storage device executed by one or more processors described here go beyond the mere concept of simply retrieving and combining data using a computer.

Accordingly, the systems and/or methods and/or code instructions described herein are inextricably tied to computing technology and/or physical components to overcome an actual technical problem arising in IR.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms set and list are sometimes interchangeable.

The systems, methods, and/or code instructions described herein automatically compute multiple PE-RLs and multiple PIE-RLs (i.e., without a user manually intervening to select a reference list and/or judge a reference list), and compute the query performance prediction of the target search query according to an aggregation of the multiple PE-RLs and multiple PIE-RLs, which is in contrast to other methods.

For example, other methods operate based on a single reference list for computing the performance prediction of a given target list. Given a target list for prediction of performance and a reference list, the target list's performance is predicted according to the similarity between the two lists, as described with reference to Oren Kurland, Anna Shtok, David Carmel, and Shay Hummel. *A unified framework for post-retrieval query performance prediction. In Proceedings of ICTIR '11* (hereinafter "Kurland1"). The single list may be based on PE-RL, or PIE-RL. Such methods operating based on a single list may at first glance seem different, as described in additional detail by Kurland1. Exemplary methods that operate based on a single PE-RL list include: Query Feedback as described with reference to Yun Zhou and W. Bruce Croft. *Query performance prediction in web search environments In Proceedings of SIGIR '07* (hereinafter "Zhou"), and Utility Estimation Framework (UEF) as described with reference to Anna Shtok, Oren Kurland, and David Carmel. *Using statistical decision theory and relevance models for query-performance prediction. In Proceedings of SIGIR '10* (hereinafter "Shtok1"). Exemplary methods that operate based on a single PIE-RL list include Weighted Information Gain (WIG) as described with reference to Zhou, and Normalized Query Commitment (NQC) as described with reference to Anna Shtok, Oren Kurland, David Carmel, Fiana Raiber, and Gad Markovits. *Predicting query performance by query-drift estimation. ACM Trans. Inf. Syst.*, 30(2):11:1-11:35 (hereinafter "Shtok3"), May 2012. In another example, other methods operate based on manually selected reference lists, for example, as described with reference to Kurland1, and Shtok1. For example, according to Kurland1, a PE-RL is generated by manually selecting 5 document samples designated as true or relevant.

In yet another example, other methods generate reference lists without designating the reference lists into PE-RL or PIE-RL, for example, as described with reference to Anna Shtok, Oren Kurland, and David Carmel. *Query performance prediction using reference lists. ACM Trans. Inf. Syst.*, 34(4):19:1-19:34, June 2016 (hereinafter "Shtok2") and Elad Yom-Tov, Shai Fine, David Carmel, and Adam Darlow. *Learning to estimate query difficulty: Including applications to missing content detection and distributed information retrieval. In Proceedings of SIGIR '05* (hereinafter "Yom-Tov").

In yet another example, other methods operate exclusively based on PE-RLs, for example, as described with reference to Oren Kurland, Anna Shtok, Shay Hummel, Fiana Raiber, David Carmel, and Ofri Rom. *Back to the roots: A probabilistic framework for query performance prediction. In Proceedings of CIKM '12.* (hereinafter "Kurland2") and Shtok2.

In yet another example, other methods operate based on a combination of a single PE-RL and a single PIE-RL, as described with reference to Kurland1.

In yet another example, Shtok2 describes a combination of an arbitrary number of PE-RL and PIE-RL based on the log-odds of the relevance of a given target list for prediction. However, as the authors themselves point out, the authors were unable to find an educated way for generating PIE-RLs. As such, the authors could not validate their proposal, rendering the method described with reference to Shtok2 inoperable.

In yet another example, instantiation with RLs that were obtained using perturbations is described with reference to Kurland2 and Shtok2, yet with no guarantee on whether a given generated RL may serve as a PE-RL, PIE-RL or none of the two, in contrast with the systems, methods, and/or code instructions describe herein that cluster each generate RL into the PE-RL cluster, the PIE-RL cluster, or neither of the clusters.

Figure 2:
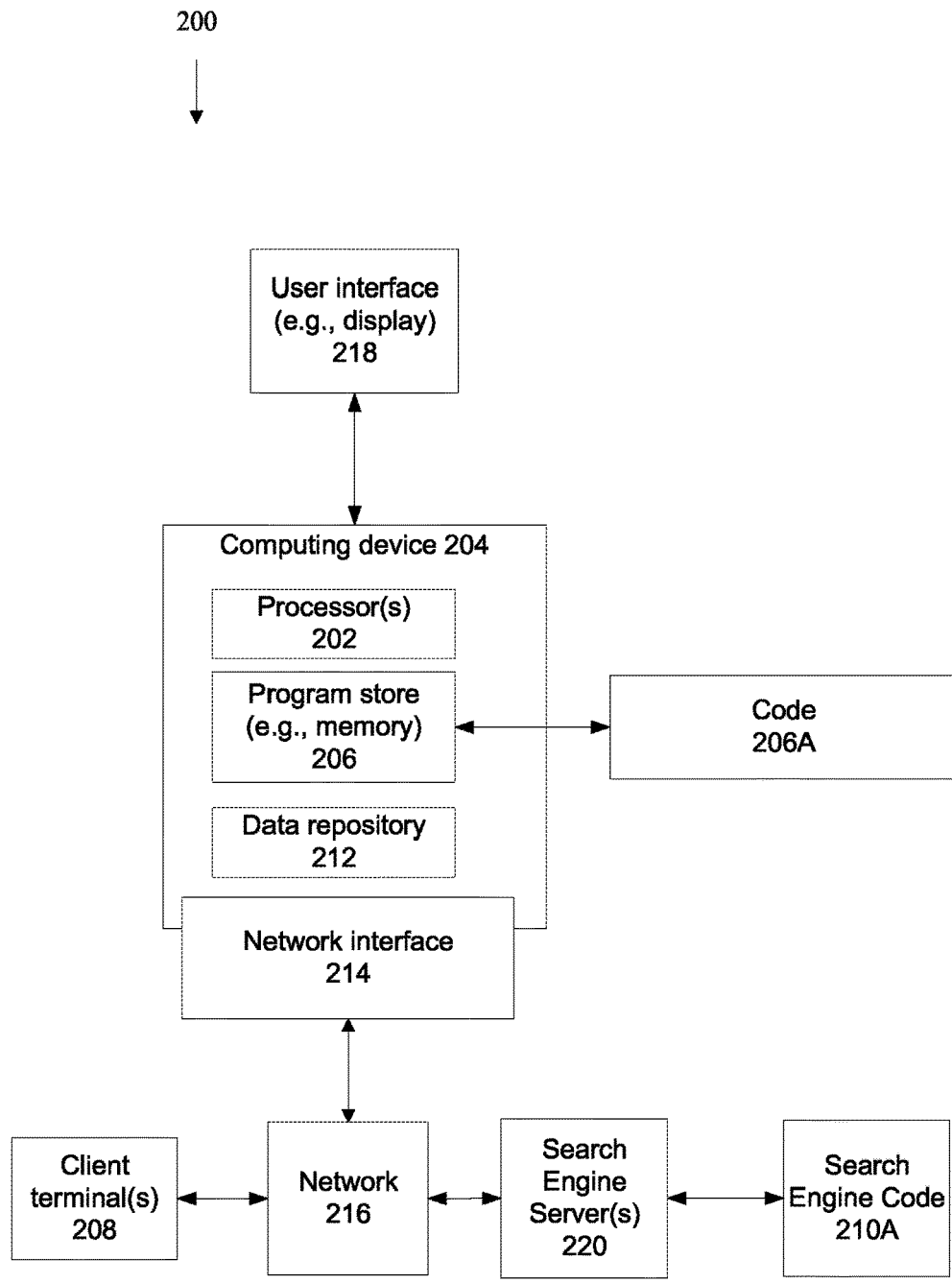
FIG. 2 is a block diagram of a system for computing a query performance prediction in response to a target search query, based on an aggregation of a cluster of PE-RL and a cluster PIE-RL that include candidate sets of search results created from variations of the target search query, in accordance with some embodiments of the present invention.

Reference is now made to FIG. 1, which is a flowchart of a method of computing a query performance prediction in response to a target search query, based on an aggregation of a cluster of PE-RL and a cluster PIE-RL that include candidate sets of search results created from variations of the target search query, in accordance with some embodiments of the present invention. Reference is also made to FIG. 2, which is a block diagram of a system 200 for computing a query performance prediction in response to a target search query, based on an aggregation of a cluster of PE-RL and a cluster PIE-RL that include candidate sets of search results created from variations of the target search query, in accordance with some embodiments of the present invention. System 200 may implemented that acts of the method described with reference to FIG. 1, by one or more hardware processors 202 of a computing device 204 executing code instructions 206A stored in a program store (e.g., memory) 206.

Computing device 204 receives a target search query originating from a client terminal 208, and a corresponding search of target search results obtained by a search code 210A optionally executed by one or more search engine servers 210.

Various architectures of computing device 204, client terminal(s) 208, and/or search engine server(s) 210 may be implemented:

- Code 206A is executed on search engine server 210 side, for example, as an integrated feature of a search engine service, for example, an online search for web pages. Computing device 204 may be integrated with, and/or installed on a certain search engine server 210, for example, code 206A is stored on a storage device (e.g., memory) associated with search engine server 210 and executable by one or more hardware processors of search engine server 210. In another example, code 206A may be implemented as an external component installed within server 210, for example, a chip and/or card inserted into a slot of serve 210.
- Code 206A is executed on client terminal 208 side, for example, as an integrated feature of a locally installed application that performs searches by remotely accessing search engine 210, for example, a locally installed web browser that accesses web search engines. Code 206A may be downloaded from a server for storage on a storage device associated with client terminal 208. In this manner, computing device 204 described herein may be integrated with client terminal(s) 208.
- Code 206A is executed by computing device 204, which provides external query performance prediction services (e.g., software as a service) to client terminals 208 and/or search engines 210. Computing device 204 may be implemented as an external computing device, which may be geographically remote from client terminal(s) 208 and/or search engine server(s) 210. The remote query performance prediction services of computing device 204 may be obtained by client terminal(s) 208 and/or search engine(s) 210 remotely accessing computing device 204, for example, using software interfaces (e.g., application programming interfaces (API), software development kits (SDK)), using locally installed applications (e.g., a web browser or other application that remotely accesses computing device 204), and/or by initiating a network connection.
- Code 206A is executed by computing device 204, with integrated client terminal 208 and/or search engine server 210, for example, as a standalone kiosk that provides search services to users.

Computing device 204 and/or search engine server(s) 210 may be implemented as, for example, a client terminal, a server, a computing cloud, a virtual server, and a virtual machine.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) s04 may include one or more processors (homogenous or heterogeneous), which may be arranged for parallel processing, as clusters and/or as one or more multi core processing units.

Storage device (also known herein as a program store, e.g., a memory) 206 stores code instructions implementable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code instructions 206A that executes one or more acts of the method described with reference to FIG. 1.

Computing device 204 may include a data repository 212 for storing data, for example, a repository that stores the received candidate reference lists and/or a repository that stores the PE-RLs and/or the PIE-RLs. Data repository 412 may be implemented as, for example, a memory, a local hard-drive, a removable storage unit, an optical disk, a storage device, and/or as a remote server and/or computing cloud (e.g., accessed via a network connection). It is noted that code 206A may be stored in data repository 212, for example, with executing portions loaded from data repository 212 into data storage device 206 for execution by processor(s) 202.

Computing device 204 may include a network interface 214 for connecting to client terminal(s) 208 and/or search engine server(s) 210 via a network 216, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 216 may be implemented as, for example, a private network, a virtual network, the internet, a local area network, a cellular network, a wireless network, a direct link (e.g., cable, wireless) and/or indirect link (e.g., via an intermediary computing unit such as a server, and/or via a storage device).

Client terminal(s) 208 may be implemented as, for example, a mobile device, a desktop computer, a thin client, a Smartphone, a Tablet computer, a laptop computer, a wearable computer, glasses computer, and a watch computer.

Computing device 204, and/or client terminal(s) 208 and/or search engine server(s) 210 include and/or are in communication with a user interface 218 that includes a mechanism for entering data (e.g., entering the target search query) and/or a mechanism for viewing data (e.g., the computed query performance prediction and/or set of search results selected according to the computed query performance prediction). Exemplary user interfaces 218 include, for example, one or more of, a touchscreen, a display, a keyboard, a mouse, and voice activated software using speakers and microphone. User interface 218 may include graphical user interface (GUI) code as an implementation of the mechanism for entering data and/or viewing data.

Referring now back to FIG. 1, at 102, a target search query and a corresponding set of target search results are received by computing device 204.

The target search query may be a textual search query including one or more words. The target search query may be received from client terminal 208, for example, via a GUI. For example, the user may manually enter the target search query into a web search site accessed by a web browser. Alternatively or additionally, the target search query may be automatically generated by code instructions.

The target search results are retrieved by search engine code 210A executing the target search query on a corpus of data-elements, for example, documents, web pages, files, and images (e.g., associated with metadata). The search engine code 210A operates according to a certain search method.

The target search results (and the candidate set of search results described herein) may be organized as a ranked list of a top predefined number of the data-elements retrieved by search engine code 210A. The ranking may be performed by search engine code 210A according to score computed by search engine code 210A for each data-element.

In terms of mathematical representation herein:

D denotes the set of target search results for which the QPP is computed. D optionally includes the top-k results, which are optionally ranked. The target search results optionally include text, for example, documents.

C denotes the corpus of data-entities.

q denotes the target search query.

M denotes the retrieval method (i.e., the search method) executed by the search engine code in response to q.

$S_M(C|q)$ denotes the score computed for corpus of data-entities C based on the scoring method of the search engine executing the target search query on the corpus.

$\hat{Q}(D|q)$ denotes the computed post-retrieval query performance prediction.

At 104, variations of the target search query are computed, optionally based on query-perturbation. The generated variations are relatively more relevant to the information need of the target search query, or relatively less relevant to the information need of the target search query.

Optionally, each of the variations of the target search query is computed by expanding the target search query with a certain single additional term. The added term is identified as relevant to one or more terms (e.g., words) of the target search query according to a relevance requirement.

In terms of mathematical representation, w denotes a single term (e.g., word) in a vocabulary V (e.g., stored as a database, list, in a file, or other implementations). $p(w|R)$ denotes a relevance model defined for target search query q according to $D^{[m]}$, where $D^{[m]}$ denotes the top-m ranked data-entities (e.g., documents) of the target search result D. $D^{[m]}$ provide pseudo-relevance feedback for relevance model $p(w|R)$, as described with reference to Victor Lavrenko and W. Bruce Croft. *Relevance based language models. In Proceedings of SIGIR '01* (hereinafter "Lavrenko").

The top-n terms $w \in V$ with the highest relevance values computed according to $p(w|R)$ are selected. For each selected term w, $q_w$ denotes the corresponding perturbed version of target search query q, obtained by expanding q with w as an additional term, optionally as a disjunctive term.

At 106, a respective candidate set of search results is obtained for each of the variations of the target search query. The candidate set of search results is retrieved from the corpus of data-entities by search engine code 210A executing the variation of the target search query.

Optionally, computing device 204 automatically transmits the variations of the target search engine query to search engine code 210A, for example, using a software interface of search engine code 210A (e.g., API, SDK). Computing device 204 receives the candidate sets of search results from search engine code 210A. The process of transmitting the variations to the search engine and receiving the candidate sets of search results may be transparent to client terminal 208 that provided the target search query (i.e., the variations and/or candidate sets are not transmitted to client terminal 208).

In terms of mathematical representation, $D_w$ denotes the respective candidate search result, optionally a relevance list (RL), optionally including the top-k data entities of the retrieved set of search results. $D_w$ is obtained by the search engine code executing $q_w$ according to M.

At 108, a statistical similarity metric indicative of statistically significant similarity or dissimilarity between each respective candidate set of search results and the set of target search results is computed.

The statistical similarity metric is indicative of whether the additional term added to the target search query (i.e., the variation) resulted in an improvement of the quality of the data-entities retrieved from the corpus based on the variation of the target search query (i.e., an increase in QPP), or have a negative effect on the quality of the data-entities retrieved from the corpus based on the variation of the target search query (i.e., a decrease in QPP), also termed drift the query according to Lavrenko.

The target search of search results obtained according to the target search query (D) provides a baseline for comparison of the candidate set of search results (RL $D_w$).

For target search query q, an assumption may be made that search engine code 210A computes according to method M, scores for data-entities (e.g., documents) in the corpus. The computed scores denoted $S_M(d|q)$ are drawn from some (optionally unknown) probability distribution. The target search results (D) scores are actually samples from the probability distribution. Exemplary methods for selecting the candidate sets of search results for clustering are based on an act of score transformation, and a selection act that is based on statistical inference.

For each respective candidate set of search results, a score transformation is computed based on an association between a first relevance score computed by the search code for the respective candidate set of search results, and a second relevance score computed by the search code for the corpus of data-entities. The statistical similarity metric is computed for each respective candidate set of search results according. The score transformation may be computed based on a normalization of the difference between the first relevance score and the second relevance score, and/or based on a ratio of the first relevance score and the second relevance score.

The statistical similarity metric may be computed as a statistical hypothesis test (e.g., of equality of distribution of means and/or equality of variances) of a first prediction score computed based on the set of target research results and a second prediction score computed based on the respective candidate set of search results. The respective candidate set of search results is clustered into the PE-RL when the null hypothesis is rejected and the second prediction score is statistically significantly higher than the first prediction score, and the respective candidate set of search results is clustered into the PIE-RL when the null hypothesis is rejected and the second prediction score is statistically significantly lower than the first prediction score.

Optionally, a confidence value associated with the statistical similarity metric is computed for each candidate set of search results. A sub-set of the candidate sets of search results is selected according to a confidence requirement. The selected sub-set of the candidates are clustered, as described herein.

Two exemplary unsupervised methods are now described for selecting the candidate sets of search results created from the variation of the target search results (RLs $D_w$) for clustering.

In a first exemplary method, for a certain query denoted q' (i.e., the search query q or the variation of the target search query $q_w$), a score transformation is computed for the scores of the data-entities (e.g., documents) in the corresponding search result set denoted D' (i.e., D or $D_w$) that was retrieved by the search engine according to retrieval method M, based on the following mathematical relationship:

$$\tilde{s}_M(d|q') \stackrel{def}{=} \frac{1}{\sqrt{|q'|}}(s_M(d|q') - s_M(C|q'))  \qquad \text{Equation (1)}$$

where:
|q'| denote the length of query q' (it is noted that $$|q_\omega| \stackrel{def}{=} |q| + 1)$$

It is noted that the WIG predictor described with reference to Zhou, defined by $$\hat{Q}_{WIG}(D'|q') \stackrel{def}{=} \frac{1}{k'} \sum_{d \in D'} \tilde{s}_M(d|q'),$$

where k'≤k, is actually the sample estimator of the mean of Equation (1) transformed score's distribution, which provides the basis for the first method of selecting the candidate sets of search results for clustering according to statistical inference.

For a large enough sample size (e.g., k'≥30), based on the assumption that the search engine (according to method M) computes scores for the retrieved data-entities (e.g., documents) are independent and identically distributed (i.i.d), according to the central limit theorem, $\hat{Q}_{WTG}(D'|q')$ follows the normal distribution. The decision of whether a certain candidate set of search results (RL $D_w$) performs statistically significantly better or worse than the target set of search results (D) may be validated by a statistical hypothesis test for the equality of (optionally normal) means. $H_0$ denotes the null hypothesis, for which it is assumed that the two score distributions denoted $\tilde{s}_M(\cdot|q)$ and $\tilde{s}_M(\cdot|q_w)$ have an equal mean. Whenever $H_0$ is accepted, then $D_w$ is rejected. Whenever $H_0$ is rejected and $\hat{Q}_{WTG}(D|q) < \hat{Q}_{WTG}(D_w|q_w)$ (also referred to herein as an association with statistical similarity), then it is assumed that $D_w$ is selected for clustering, and added to the cluster of PE-RL. Whenever $H_0$ is rejected and $\hat{Q}_{WTG}(D|q) > \hat{Q}_{WTG}(D_w|q_w)$ (also referred to herein as an association with statistical dissimilarity), then it is assumed that $D_w$ is selected for clustering, and added to the cluster of PIE-RL. The hypothesis may be validated, for example, by computing Welch's t-test for equality of means with 95% (or other requirement value) of confidence, as described with reference to Bernard L Welch. *The generalization of student's' problem when several different population variances are involved. Biometrika*, 34(1/2):28-35, 1947 (Hereinafter "Welch").

In a second exemplary method, the score transformation is computed according to the following mathematical relationship:

$$\tilde{s}_M(d\,|\,q') \overset{def}{=} \frac{s_M(d\,|\,q')}{s_M(C\,|\,q')} \qquad \text{Equation (2)}$$

Based on the relationship $$\mathrm{Var}\left(\frac{1}{c}x\right) \overset{def}{=} \frac{1}{c^2}\mathrm{Var}(x)$$

for a given variable x and real constant c, it is noted that the NQC predictor described with reference to Zhou, defined by $$\hat{Q}_{NQC}(D'\,|\,q') \overset{def}{=} \sqrt{\frac{1}{k'} \sum_{d\in D'} (\tilde{s}_M(d\,|\,q') - \tilde{s}_M(D'\,|\,q'))^2}\,,$$

(where k'≤k and $\tilde{s}_M(D'|q')$ further denotes the sample mean of the transformed scores of the data-entities of D') is indicative of the sample estimation of the standard deviation of Equation 2 transformed scores' distribution.

Some features of the second exemplary method are based on United States Patent Application Publication No. 20170075893 titled "Query performance prediction using a what-if analysis approach" by Shay Hummel, Ella Rabinovich, and Haggai Roitman (the same inventor as the present application) (hereinafter "'893 application"). However, the second exemplary method described herein includes additional features not suggested or related to in the '893 application, in particular, an implementation based on the PIE-RL, and computation of the NQC predictor for QPP with reference lists.

A statistical test is performed for selecting the candidate sets of search results for clustering. $H_0$ denotes the null hypothesis, for which it is assumed that the two score distributions denoted $\tilde{s}_M(\bullet|q)$ and $\tilde{s}_M(\bullet|q_w)$ have an equal variance. The variance may be estimated by computing the square of $\hat{Q}_{NQC}(D'|q'))$. Whenever $H_0$ is accepted, then $D_w$ is rejected. Whenever $H_0$ is rejected and $\hat{Q}_{NQC}(D|q)<\hat{Q}_{NQC}(D_w|q_w)$ (also referred to herein as an association with statistical similarity) then it is assumed that $D_w$ is selected for clustering, and added to the cluster of PE-RL. Whenever $H_0$ is rejected and $\hat{Q}_{NQC}(D|q)>\hat{Q}_{NQC}(D_w|q_w)$ (also referred to herein as an association with statistical dissimilarity), then it is assumed that $D_w$ is selected for clustering, and added to the cluster of PIE-RL. The hypothesis may be validated, for example, by computing the Brown-Forsythe test for equality of variances with 95% (or other requirement value) of confidence, as described with reference to Morton B Brown and Alan B Forsythe. *Robust tests for the equality of variances. Journal of the American Statistical Association*, 69(346):364-367, 1974 (Hereinafter "Brown").

At 110, the selected candidate sets of search results are clustered into a cluster of pseudo effective reference lists (PE-RL) and into a cluster of pseudo ineffective reference lists (PIE-RL). In terms of mathematical representation, $D^+_{ref}$ denotes the cluster of PE-RL, and $D^-_{ref}$ denotes the cluster of PIE-RL. It is noted that acts 108 and 110 may be implemented as a common process in which the selection and clustering are performed as an integrated act.

For example, as described with reference to block 108, selected candidate sets of search results that are associated with statistically dissimilarity are clustered into the PIE-RL cluster, and selected candidate sets of search results that are associated with statistical similarity are clustered into the PE-RL.

As described with reference to block 108, candidate sets of search results having a performance that is statistically significantly better (i.e., PE) or statistically significantly worse (i.e. PIE) are selected according to a confidence requirement of the hypothesis. Candidate sets of search results for which no statistically significant (better or worse) values are computed and/or that do not obtain a confidence threshold of the confidence requirement (e.g., below 95% confidence) are discarded.

The target search query (associated with the target search results) that is relatively more similar to the PE-RL cluster is associated with a relatively higher query performance prediction than the target search query that is relatively more similar to the PIE-RL cluster.

In terms of mathematical representation, for a certain selected candidate set of search results from the PR-RL cluster or PIE-RL cluster, denoted RL $D_w \in D^+_{ref} \cup D^-_{ref}$, $pv(D_w)$ denotes the p-value of the statistical test used to validate the selection of the certain candidate set of search results. The lower the value of $pv(D_w)$, the greater the confidence in the selection of the certain candidate set of search results $D_w$.

Optionally, a sub-set of the selected candidate set of search results is selected according to a requirement of statistical test used to validate the selection of the candidate sets of search results for clustering. The sub-set is indicative of the most statistically significant sets of search results. Sets excluded from the sub-set are ignored and/or pruned from the aggregation. It is noted that the sub-set may be selected prior to clustering, or may be selected from the formed clusters.

In terms of mathematical representation, $D^{+[l]}_{ref}$ denotes the l members of the PE-RL cluster, denoted $D_w \in D^+_{ref}$ associated with the lowest values of $pv(D_w)$, and $D^{-[l]}_{ref}$ denotes the l members of the PIE-RL cluster, denoted $D_w \in D^-_{ref}$ associated with the lowest values of $pv(D_w)$ At 112, the query performance prediction is computed, for the target search results obtained in response to the target search query. The QPP is computed according to an aggregation of the PR-RL cluster and PIE-RL cluster. The aggregation may be computed for the selected sub-set of members of the PR-RL and PIE-RL cluster. As used herein, the PR-RL cluster and the PIE-RL cluster refer to the select sub-set in the cases where the sub-set is selected.

Optionally, the aggregation of the PE-RL cluster and the PIE-RL cluster is based on a weighted mean of a computed prediction quality score of each member of the PE-RL cluster and each member of the PIE-RL cluster.

The weight of the weighted mean is computed according to a statistical similarity metric of the target search results and the PE-RL cluster and the PIE-RL cluster, and the mean of the weighted is according to the computed prediction quality score. The statistical similarity metric is defined according to the implemented exemplary method described with reference to act 108, for example, the first exemplary method or the second exemplary method.

In terms of mathematic representation, the performance of target search results D based on the weighted mean of the predicted qualities of the members of the clusters denoted RL $D_w \in D^{+[l]}_{ref} \cap D^{-[l]}_{ref}$ is computed by the following relationship:

$$\hat{Q}_{RLS}^{[base]}(D \mid q) \overset{def}{=} \frac{\sum_{D_w} \varphi_w \cdot \hat{Q}_{[base]}(D_w \mid q_w)}{\sum_{D_w} \varphi_w} \quad \text{Equation (3)}$$

where $Q_{[base]}(D_w|q_w,r)$ denotes for example, the WIG baseline (described with reference to the first exemplary method of act 108) or the NQC baseline (described with reference to the second exemplary method of act 108), according to the implementation of the first or second or another exemplary method in act 108.

$\varphi_w$ denotes the weight (e.g., importance) of RL $D_w$, computed by the following relationship:

$$\varphi_w \overset{def}{=} \begin{cases} sim(D, D_w), & D_w \in \mathcal{D}_{ref}^{+[l]} \\ 1 - sim(D, D_w) & D_w \in \mathcal{D}_{ref}^{-[l]} \end{cases} \quad \text{Equation (4)}$$

Where $sim(D, D_w)$ denotes the similarity between the target search results and a certain RL $D_w$, as described with reference to Kurlan2 and Shtok2.

According to Equation 3, the more statistically similar the target search list D is to the PE-RL cluster, and the more statistically dissimilar the target search list is from the PIE-RL cluster, the better the predicted query performance.

Optionally, the aggregation of the PE-RL and the PIE-RL is performed according to an inter-set similarity metric indicative of a level of agreement between an expected and an observed intersection size between the target search results and each member of the PE-RL cluster and the PIE-RL cluster. The list-wise similarity may be computed based on the consistency-index measure described in the context of sequential forward (feature) selection with reference to Ludmila I. Kuncheva. *A stability index for feature selection. In Proceedings of AIAP* '07 (Hereinafter "Kuncheva"). The intersection size between two random subsets of a given set follows a hypergeometric distribution. The consistency-index measures the level of agreement between the expected and the observed intersection sizes between two given subsets. The normalized [0, 1] consistency-index based similarity is computed according to the following mathematical relationship:

$$sim(D, D_w) \overset{def}{=} \frac{1}{2} + \frac{|D \cap D_w| \cdot n_C - k^2}{2k(n_C - k)}$$

where $n_C$ denotes the number of data-entities (e.g., documents) in corpus C.

It is noted that:
when $|D \cap D_w|=k$, then $sim(D, D_w)=1$,
when $|\cap D_w|=0$, then $$\lim_{k \to \frac{n_C}{2}} sim(D, D_w) = 0.$$

At 114, the query performance prediction is outputted. The query performance prediction may be forwarded to the client terminal that provided the target search query, optionally for presentation on the display of the client terminal. The value of the QPP may be used by the user to ascertain the validity of the target search results. For example, when the QPP is low, the user may discard the target search results and reword the search query in an attempt to obtain a higher QPP indicative of relevant target search results.

Alternatively or additionally, at 116, computed QPP is further processed by computing device 204, by search engine 210, and/or by another process.

Optionally, code instructions executing a vertical search process (i.e., where the target search query is sent to multiple search engines) compute the QPP for each set of search results obtained from each search engine executing the target search query. The search results associated with the highest QPP may be identified as more relevant to the target search query, and optionally forwarded to the client terminal from which the target search query was received, for presentation on the display of the client terminal.

Alternatively or additionally, code instructions executing a fusion process (i.e., where results provided by multiple search engines in response to a search query are combined) receive the QPP computed for each set of search results obtained from each search engine executing the target search query. The weights assigned to search set of results obtained from the different search engines are computed based on the QPP associated with each set of search results.

Alternatively or additionally, code instructions executing a query suggestion process, compute recommendations for rewriting of the target search query to improve the reliability and/or relevance of the results according to the QPP of each rewriting of the target search query. The re-written target search query (or queries) associate with the highest QPP may be recommended to the user.

Figure 3:
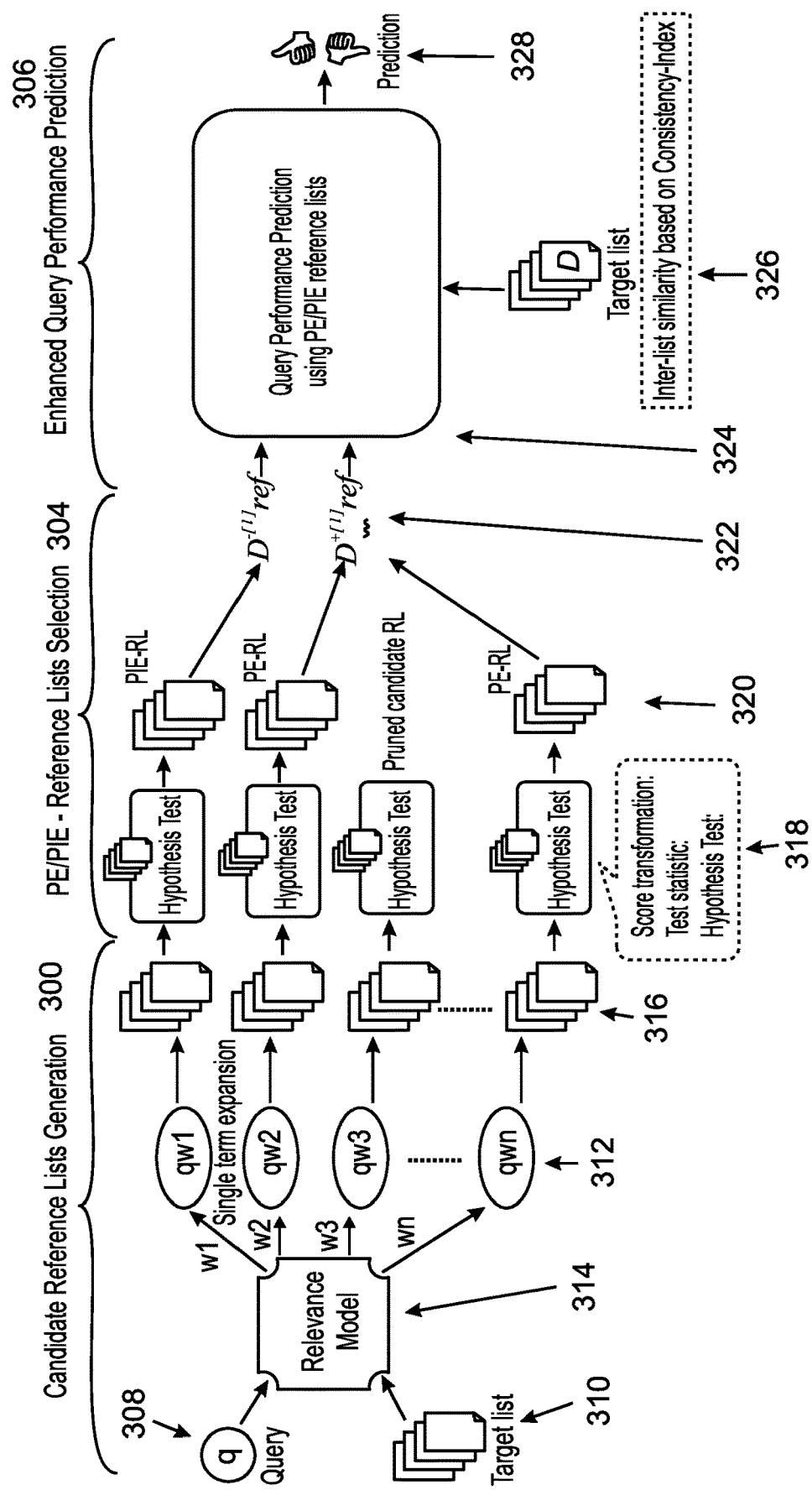
FIG. 3 is a schematic graphically depicting an exemplary process of computing a query performance prediction in response to a target search query, based on an aggregation of a cluster of PE-RL and a cluster PIE-RL that include candidate sets of search results created from variations of the target search query, in accordance with some embodiments of the present invention.

Reference is now made to FIG. 3, which is a schematic graphically depicting an exemplary process of computing a query performance prediction in response to a target search query, based on an aggregation of a cluster of PE-RL and a cluster PIE-RL that include candidate sets of search results created from variations of the target search query, in accordance with some embodiments of the present invention. The elements described with reference to FIG. 3 as described as an exemplary implementation of the method described in detail with reference to FIG. 1, as described herein. The elements described with reference to FIG. 3 may be implemented by components of system 200 described with reference to FIG. 2.

FIG. 3 graphically depicts a process of candidate reference list generation 302 (corresponding to acts 102, 104, and 106 described with reference to FIG. 1), creation of the PE-RL and PIE-RL clusters 304 (corresponding to acts 108 and 110 described with reference to FIG. 1), and query performance prediction 306 (corresponding to acts 112 and 114 described with reference to FIG. 1).

The process of candidate reference list generation includes receiving a target search query 308 and a target list of search results 310 (as described with reference to act 102 of FIG. 1), generating variations 312 of the target search query by single term expansion according to a relevance model 314 (as described with reference to act 104 of FIG. 1), and obtaining candidate sets of search results 316 (as described with reference to act 106 of FIG. 1).

The process of PE/PIE reference list selection 304 includes performing a statistical similarity computation 318 on each candidate set of search results, by computing a score transformation, a test statistic, and a hypothesis test (as described with reference to act 108 of FIG. 1), selecting candidate set of search results 320 for clustering and pruning non-selected candidate sets, and clustering 322 the selected candidate sets into the PE-RL cluster and the PIE-RL cluster (as described with reference to act 110 of FIG. 1).

The process of computing the query performance prediction 306 includes aggregating 324 the PE-RL cluster and the PIE-RL cluster according to an inter-list similarity based on the consistency-index 326 (as described with reference to act 112 of FIG. 1), and providing the computed prediction 328 (as described with reference to act 114 of FIG. 1).

Various embodiments and aspects of the systems, methods, and/or code instructions as delineated hereinabove and as claimed in the claims section below find calculated support in the following examples.

EXAMPLES

Reference is now made to the following examples, which together with the above descriptions illustrate some embodiments of the systems, methods, and/or code instructions described herein in a non limiting fashion.

Datasets and Setup

The TREC (Text Retrieval Conference) corpora and queries used for the evaluation described herein are summarized in Table 1 below.

TABLE 1

| Corpus | #documents | Queries | Disks |
|--------|-----------|---------|-------|
| SJMN | 90,257 | 51-150 | 3 |
| WSJ | 173,252 | 151-200 | 1-2 |
| AP | 242,918 | 51-150 | 1-3 |
| ROBUST | 528,155 | 301-450, 601-700 | 4&5-{CR} |
| WT10g | 1,692,096 | 451-550 | WT10g |
| GOV2 | 25,205,179 | 701-850 | GOV2 |

The benchmarks of Table 1 were used in previous QPP works, for example, as described with reference to David Carmel and Oren Kurland. *Query performance prediction for ir. In Proceedings of SIGIR '12* (Hereinafter "Carmel"), especially in methods based on a reference list, for example, as described with reference to Kurland1, Kurland2, Shtok1, and Shtok2. Titles of TREC topics were used as queries. The Apache Lucene (described with reference to www(dot)lucene(dot)apache(dot)org) open source search library was used for indexing and searching documents. Documents and queries were processed using Lucene's English text analysis (i.e., tokenization, Poter stemming, stopwords, and the like). As the underlying retrieval method (denoted M), Lucene's query-likelihood implementation with the Dirichlet smoothing parameter fixed to $\mu=1000$ was implemented. Lucene's query-likelihood implementation is described with reference to www(dot)lucene(dot)apache(dot)org/core/6_0_0/core/org/apache/lucene/search/similarities/LMDirichletSimilarity(dot)html.

For each query, the performance of the target list (denoted D) was predicted based on the top-1000 retrieved documents (denoted k=1000). Following the common practice for QPP described with reference to Carmel, the prediction over queries quality was measured by the Pearson correlation between the predictor's values and the actual average precision (AP@1000) values calculated using TREC's relevance judgments.

The Relevance Model 3 (RM3) method, described with reference to Lavrenko, was implemented for generating candidate RLs. The top-100 (denoted n=100) terms w ∈ V with the highest $p_{RM3}(w|R)$ were selected. The RM3 parameters were further fixed as follows: m=10 (i.e., the number of pseudo-relevance feedback documents) and $\lambda=0.9$ (i.e., query anchoring). Two parameters were left for tuning: k'∈{30, 50, 100, 150, 200, 500, 1000} denoting the sample size used for deriving the WIG and NQC RLs based selection methods; and l∈{1, 2, ..., 100} denoting the number of the lowest p-valued RLs in $D^+_{ref}$ and $D^-_{ref}$ to be used for the prediction computation. The SJMN corpus was implemented for training; with (k'=100, l=5) and (k'=150, l=3) tuned for the WIG and NQC based selection methods, respectively. The rest of the corpora for implemented for testing.

Baselines

The QPP approach of the systems, methods, and/or code instructions described herein was compared to the following baseline. Both baseline QPP method (i.e., WIG and NQC) were evaluated as standalone methods. The value of k' (denoting the number of high ranked documents used for prediction) was to 5 for WIG based on the recommendation described with reference to Zhou and set to 150 for NQC based on the recommendation described with reference to Shtok3. The QF method was evaluated as an alternative QPP method based on query-perturbation, as described with reference to Zhou. It is noted that other query-perturbation based method are omitted from further discussion, for example, as described with reference to Yom-Tov, since such methods resulted in a much lower performance compared to QF.

As described with reference to Zhou: An expanded query was run based on a similar selection of the top-100 terms w (∈V) with the highest $p_{RM3}(w|R)$. $D_R$ denotes the corresponding retrieved RL [12]. The prediction based on QF is provided by the number of documents that are shared among the top-m documents in D and RL $D_R$ (m=50, according to Zhou).

Other state-of-the-art QPP alternatives that also utilized one or more PE-RLs or PIE-RLs, as described with reference to Kurland1, Kurland2, Shtok1, and Shtok2 were evaluated. As discussed herein in additional detail, none of the cited approaches proposed an operative method in which both PE-RLs and PIE-RLs, each including multiple RL members, are automatically generated as described by the systems, methods, and/or code instructions described herein. For example, Kurland1 and Shtok1 relate to manual selection of RLs, in contrast to the automatic selection described herein. Kurland2 and Shtok2 methods were instantiated with RLs that were obtained using perturbations, yet with no guarantee on whether a given generated RL may serve as a PE-RL, PIE-RL or none of the two, in contrast with the systems, methods, and/or code instructions describe herein that cluster each generate RL into the PE-RL cluster, the PIE-RL cluster, or neither of the clusters.

The UEF method described with reference to Shtok1, implements the pseudo-relevance feedback set $D^{[m]}$ as a single PE-RL. The prediction is calculated according to the following mathematical relationship:

$$\hat{Q}_{UEF}^{[base]}(D|q) \overset{def}{=} sim(D, \pi_R(D))\hat{Q}_{[base]}(D^{[m]}|q)$$

where $\pi_R(D)$ denotes the reranking (permutation) of D according to the (RM1) relevance model $p_{RM1}(w|R)$ (i.e., $\lambda=0$) according to Shtok1. Based on Shtok1, sim(D, $\gamma_R(D)$) was measured by Pearson's correlation (on document scores) and setting m=5 and m=150 respectively for the WIG and NQC base predictors.

The RefList method described with reference to Kurland2 was evaluated, by implementing an extended approach of UEF Kurland2 designed to utilize several RLs. 10 RLs $D_\mu$ were generated according to Kurland2, by varying the smoothing parameter $\mu \in \{100, 200, 500, 800, 1500, 2000, 3000, 4000, 5000, 10000\}$ implemented for QL scoring of documents in the corpus given a target search query (denoted q). The RefList prediction is calculated based on the following mathematical relationship:

$$\hat{Q}_{RefList}^{[base]}(D|q) \stackrel{def}{=} \sum_{\mu} sim(D, D_\mu) \hat{Q}_{[base]}(D_\mu | q_\mu)$$

where $sim(D, D_\mu)$ is computed according to Perason's correlation described with reference to Kurland2.

The method described with reference to Kurland1 (denoted PE-PIE) was evaluated. The prediction of the quality is based on a single PE-RL (denoted $D^+_\alpha$) and a single PIE-RL (denoted $D^-_\alpha$) based on the following mathematical relationship:

$$\hat{Q}_{PE-PIE}(D|q) \stackrel{def}{=} \alpha sim(D, D^+_\alpha) - (1-\alpha) sim(D, D^-_\alpha)$$

where $\alpha \in [0,1]$, and $D^+_\alpha$ and $D^-_\alpha$ are selected to be the most significant PE-RL and PIE-RL (i.e., according to $pv(D_w)$ in $D^+_{ref}$ and $D^-_{ref}$ respectively. The a smoothing parameter was tuned using the SJMN dataset; yielding $\alpha=0.5$.

The LogOdds approach proposed by Shtok et al. with reference to Shtok2 was implemented. The LogOdds method is based on extending RefList with a PE-PIE inspired PE-RLs and PIE-RLs utilization. The prediction based on the LogOdds approach is computed according to the following mathematical relationship:

$$\hat{Q}_{LogOdds}^{[base]}(D|q) \stackrel{def}{=} \log \frac{\sum_{D_w \in \mathcal{D}^+_{ref}} sim(D, D_w) \hat{Q}_{[base]}(D_w | q_w)}{\sum_{D_w \in \mathcal{D}^-_{ref}} sim(D, D_w) \hat{Q}_{[base]}(D_w | q_w)}$$

where $sim(D, D_w)$ is computed according to the rank-biased overlap measure (RBO), with the free parameter set to 0.99. As discussed herein, Shtok2 discusses that an educational way to obtain PIE-RLs could not be found, and therefore, the described approach has not been fully validated.

For all of the above described evaluations of methods, base $\in \{WIG, NQC\}$ was implemented for instantiating $Q_{[base]}(\cdot|\cdot)$. Statistical difference in correlations was measured as described with reference to www(dot)personality-project(dot)org/r/html/paired(dot)r(dot)html.

Results

The results of the evaluations of the methods described above are summarized in Table 2A and Table 2B. Table 2A summarizes results for methods compared based on WIG as the base method. Table 2B summarizes results for the method compared based on the NQC as the base method. Table 2A and 2B depict Pearson's correlation to AP per corpus and evaluated QPP method. The best results for Table 2A and 2B, per corpus, are bolded, and were obtained by the RLS method (refers herein to the systems, methods, and/or code instructions described herein). Values denoted with the subscript b denote a statistically significant different with reference to the base QPP method (i.e., WIG in Table 2A and NQC in Table 2B) and values denoted with superscript r denote a statistically significant different with reference to the RLS method.

TABLE 2A

|  | WSJ | AP | ROBUST | WT10g | GOV2 |
| --- | --- | --- | --- | --- | --- |
| WIG | .677 | $.617^r$ | $.528^r$ | $.407^r$ | $.487^r$ |
| QF | $.460_b^r$ | $.487_b^r$ | $.435_b^r$ | $.373_b^r$ | $.368_b^r$ |
| PE-PIE[WIG] | $.097_b^r$ | $.115_b^r$ | $.265_b^r$ | $.188_b^r$ | $.362_b^r$ |
| UEF[WIG] | $.607_b^r$ | $.655_b^r$ | $.576_b^r$ | $.425^r$ | $.475^r$ |
| RefList[WIG] | .668 | $.651^r$ | $.523_b^r$ | $.398^r$ | $.516_b^r$ |
| LogOdds[WIG] | $-.065_b^r$ | $-.121_b^r$ | $-.202_b^r$ | $-.130_b^r$ | $-.125_b^r$ |
| RLS[WIG] | .702 | $.678_b$ | $.591_b$ | $.472_b$ | $.533_b$ |

TABLE 2B

|  | WSJ | AP | ROBUST | WT10g | GOV2 |
| --- | --- | --- | --- | --- | --- |
| NQC | .727 | $.602^r$ | $.557^r$ | $.496^r$ | $.348^r$ |
| QF | $.460_b^r$ | $.487_b^r$ | $.435_b^r$ | $.373_b^r$ | $.368_b^r$ |
| PE-PIE[NQC] | $.097_b^r$ | $.115^r$ | $.265_b^r$ | $.188_b^r$ | $.362^r$ |
| UEF[NQC] | $.712^r$ | .625 | $.581^r$ | $.533_b^r$ | $.372_b^r$ |
| RefList[NQC] | .725 | .630 | $.552^r$ | $.491^r$ | $.430_b$ |
| LogOdds[NQC] | $-.012_b^r$ | $-.188_b^r$ | $-.223^r$ | $-.058_b^r$ | $-.053_b^r$ |
| RLS[NQC] | .748 | $.653_b$ | $.619_b$ | $.553_b$ | $.424_b$ |

Comparing the results obtained according to RLS side-by-side with the results obtained according to the WIG and NQC base methods, it is observed that RLS boosts the performance of the NQC method (significantly in most cases); with an average of +10.2±2% and +11.2±3% improvement over WIG and NQC, respectively.

Comparing RLS side-by-side with the other alternatives, it is observed that RLS in all cases but one, provides better prediction quality (significantly in most cases); with an average improvement of +5.2±1.6% and +3±1.4% over the best possible alternative, when WIG and NQC are used as the underlying base method, respectively.

It is observed that, while RLS provided a constant improvement over WIG and NQC, when WIG and NQC were used as the underlying base methods, the other alternatives do not share the same improvement. A closer examination of the results of these alternatives across the corpora shades some light. Focusing on the UEF method, it is observed that, in most cases, an improvement is obtained in the base method's performance. Yet, in 3 out of the 10 cases, the UEF method did not manage to improve over the base method, which may be attributed to the $D^{[m]}$ RL utilized by UEF for prediction, where for some corpora such RLs do not comply with UEF's PE-RL assumption. Hence, measuring the similarity with such RLs actually results in performance degradation. The above argument is further supported by examining the performance of the RefList method, where in 4 out of the 10 cases an improvement was obtained over the base method. Such additional performance degradation may be attributed to the fact that RefList aggregates over several RLs with no distinction of their type, and, therefore, it may accumulate even more error.

Closer examination of the two alternative methods PE-PIE and LogLoss that do distinguish between both types of RLs, further reveals an interesting trend. It is observed that, PE-PIE in 9 out of 10 cases has resulted in much worse performance than that of the base method used to obtain the two PE-RL and PIE-RL lists. Therefore, it seems that a simple linear interpolation of a PE-RL with a PIE-RL as proposed by the PE-PIE method, where the dissimilarity from the PIE-RL is calculated by subtraction, does not actually work well. Similar to the UEF vs. RefList case, a further comparison of the PE-PIE with LogLoss supports this argument, where the summation over several PIE-RLs using a similar (log) subtraction approach only results in further performance degradation due to more accumulated error.

In conclusion, among the various alternatives examined herein, none has actually exhibited prediction performance as robust as the RLS approach of the systems, methods, and/or code instructions described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant target search queries will be developed and the scope of the term target search query is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of providing a client terminal with a query performance prediction in response to a target search query, comprising:
   executing a code by at least one hardware processor of a computing device for:
      receiving a target search query and a corresponding set of target search results obtained by a search code executing the target search query on a corpus of data-elements;
      computing a plurality of variations of the target search query;
      receiving a respective candidate set of search results for each of the plurality of variations of the target search query executed by the search code on the corpus of data-elements;
      computing a statistical similarity metric indicative of statistically significant similarity or dissimilarity between each respective candidate set of search results and the set of target search results;
      clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement,
      wherein the clustering is performed, for each respective candidate set of search results corresponding to one of the plurality of variations of the target search, by comparing the statistical similarity metric computed for the respective candidate set of search results to a threshold value:
(i) when the statistical similarity metric is greater than the threshold, adding the respective candidate set of search results corresponding to one of the plurality of variations of the target search query only to the cluster of PE-RL, and
(ii) when the statistical similarity metric is less than the threshold, adding the respective candidate set of search results corresponding to one of the plurality of variations of the target search query only to the cluster of PIE-RL;
computing the query performance prediction of the target search results responsive to the target search query according to an aggregation of the PR-RL cluster and PIE-RL cluster; and
outputting the query performance prediction.

2. The computer implemented method of claim 1, wherein each of the plurality of variations of the target search query are computed by expanding the target search query with a respective single additional term identified as relevant to one or more terms of the target search query according to a relevance requirement.

3. The computer implemented method of claim 1, further comprising:
computing, for each respective candidate set of search results, a score transformation computed based on an association between a first relevance score computed by the search code for the respective candidate set of search results and a second relevance score computed by the search code for the corpus of data-entities;
wherein the statistical similarity metric is computed according to the score transformation computed for the respective candidate set of search results.

4. The computed implemented method of claim 3, wherein the score transformation is computed based on at least one of: a normalization of the difference between the first relevance score and the second relevance score, and a ratio of the first relevance score and the second relevance score.

5. The computer implemented method of claim 1, wherein the statistical similarity metric is computed as a statistical hypothesis test of equality of distribution of means of a first prediction score computed based on the set of target research results and a second prediction score computed based on the respective candidate set of search results, wherein the respective candidate set of search results is clustered into the PE-RL when a null hypothesis is rejected and the second prediction score is statistically significantly higher than the first prediction score, and wherein the respective candidate set of search results is clustered into the PIE-RL when the null hypothesis is rejected and the second prediction score is statistically significantly lower than the first prediction score.

6. The computer implemented method of claim 1, wherein the statistical similarity metric is computed as a statistical hypothesis test of equality of variance of a first prediction score computed based on the set of target research results and a second prediction score computed based on the respective candidate set of search results, wherein the respective candidate set of search results is clustered into the PE-RL when a null hypothesis is rejected and the second prediction score is statistically significantly higher than the first prediction score, and wherein the respective candidate set of search results is clustered into the PIE-RL when the null hypothesis is rejected and the second prediction score is statistically significantly lower than the first prediction score.

7. The computer implemented method of claim 1, further comprising computing a confidence value associated with the statistical similarity metric computed for each candidate set of search results, and selecting a sub-set of the candidate sets of search results according to a confidence requirement, wherein the clustering is performed for the selected sub-set of the candidates.

8. The computed implemented method of claim 1, wherein the aggregation of the PE-RL cluster and the PIE-RL cluster is based on a weighted mean of a computed prediction quality score of each member of the PE-RL cluster and each member of the PIE-RL cluster.

9. The computed implemented method of claim 8, wherein the weight of the weighted mean is computed according to the statistical similarity metric between the target search results and the respective member of the PE-RL cluster and the respective member of the PIE-RL cluster, and the mean of the weighted mean is according to the computed prediction quality score.

10. The computed implemented method of claim 1, wherein the target search query associated with the target search result that is relatively more similar to the PE-RL cluster is associated with a relatively higher query performance prediction than the target search query associated with the target search result that is relatively more similar to the PIE-RL cluster.

11. The computed implemented method of claim 1, wherein the aggregation of the PE-RL cluster and the PIE-RL cluster is performed according to an inter-set similarity metric indicative of a level of agreement between an expected and an observed intersection size between the target search results and each member of the PE-RL cluster and the PIE-RL cluster.

12. The computer implemented method of claim 1, wherein the target search result and the candidate set of search results include a list of a top predefined number of data-elements from the corpus each associated with a score computed by the search code.

13. The computer implemented method of claim 1, wherein the more statistically similar the target search list is to the PE-RL cluster, and the more statistically dissimilar the target search list is from the PIE-RL cluster, the better the predicted query performance of the target search query.

14. The computer implemented method of claim 1, further comprising executing a vertical search process based on forwarding the target search query to a plurality of search engines, wherein the query performance prediction is computed for each target search results received from each search engine of the plurality of search engines, and selecting a certain target search result received from a certain search engine according to a requirement of the computed query performance prediction.

15. The computer implemented method of claim 1, further comprising executing a fusion process based on forwarding the target search query to a plurality of search engines, wherein the query performance prediction is computed for each target search results received from each search engine of the plurality of search engines, computing a weight for each respective target search result received from each search engine of the plurality of search engines according to the computed query performance prediction, and computing a combination of search results according to the weights.

16. The computer implemented method of claim 1, further comprising executing a query suggestion process based on computing a plurality of amended versions of the target search query, wherein the query performance prediction is computed for each amended versions of the target search query, and selecting a certain amended version of the target search query according to a requirement of the computed query performance prediction.

17. A system for providing a client terminal with a query performance prediction in response to a target search query, comprising:
a non-transitory memory having stored thereon a code for execution by at least one hardware processor of a computing device, the code comprising:
code for receiving a target search query and a corresponding set of target search results obtained by a search code executing the target search query on a corpus of data-elements;
code for computing a plurality of variations of the target search query;
code for receiving a respective candidate set of search results for each of the plurality of variations of the target search query executed by the search code on the corpus of data-elements;
code for computing a statistical similarity metric indicative of statistically significant similarity or dissimilarity between each respective candidate set of search results and the set of target search results;
code for clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement,
wherein the clustering is performed, for each respective candidate set of search results corresponding to one of the plurality of variations of the target search, by comparing the statistical similarity metric computed for the respective candidate set of search results to a threshold value:
(i) when the statistical similarity metric is greater than the threshold, adding the respective candidate set of search results corresponding to one of the plurality of variations of the target search query only to the cluster of PE-RL, and
(ii) when the statistical similarity metric is less than the threshold, adding the respective candidate set of search results corresponding to one of the plurality of variations of the target search query only to the cluster of PIE-RL;
code for computing the query performance prediction of the target search results responsive to the target search query according to an aggregation of the PR-RL cluster and PIE-RL cluster, and
code for outputting the query performance prediction.

18. The system of claim 17, wherein the computing device comprises a search engine server that further stores on the non-transitory memory the search code for executing the target search query on the corpus of data-elements, wherein the search code is executed by the at least one hardware processor of the search engine server.

19. A computer program product for providing a client terminal with a query performance prediction in response to a target search query, comprising:
a non-transitory memory having stored thereon a code for execution by at least one hardware processor of a computing device, the code comprising:
instructions for receiving a target search query and a corresponding set of target search results obtained by a search code executing the target search query on a corpus of data-elements;
instructions for computing a plurality of variations of the target search query;
instructions for receiving a respective candidate set of search results for each of the plurality of variations of the target search query executed by the search code on the corpus of data-elements;
instructions for computing a statistical similarity metric indicative of statistically significant similarity or dissimilarity between each respective candidate set of search results and the set of target search results;
instructions for clustering the candidate sets of search results into a cluster of pseudo effective reference lists (PE-RL) according to an association with statistical similarity requirement, and into a cluster of pseudo ineffective reference lists (PIE-RL) according to an association with statistically dissimilarity requirement,
wherein the clustering is performed, for each respective candidate set of search results corresponding to one of the plurality of variations of the target search, by comparing the statistical similarity metric computed for the respective candidate set of search results to a threshold value:
(i) when the statistical similarity metric is greater than the threshold, adding the respective candidate set of search results corresponding to one of the plurality of variations of the target search query only to the cluster of PE-RL, and
(ii) when the statistical similarity metric is less than the threshold, adding the respective candidate set of search results corresponding to one of the plurality of variations of the target search query only to the cluster of PIE-RL;
instructions for computing the query performance prediction of the target search results responsive to the target search query according to an aggregation of the PR-RL cluster and PIE-RL cluster; and
instructions for outputting the query performance prediction.

20. The computer implemented method of claim 1, wherein when the statistical similarity metric computed for a certain candidate set of search results corresponding to one of the plurality of variations of the target search query meets a condition, the certain candidate set of search results is added to the cluster of PE-RL, and when the condition is not met the certain candidate set of search results is added to the cluster of PIE-RL.

* * * * *